United States Patent [19]

Smith

[11] Patent Number: 4,482,597
[45] Date of Patent: Nov. 13, 1984

[54] INSULATING MATERIAL

[75] Inventor: Peter Smith, Hoddesdon, England

[73] Assignee: Spic International Limited, Hoddesdon, England

[21] Appl. No.: 453,891

[22] PCT Filed: Apr. 28, 1982

[86] PCT No.: PCT/GB82/00127
§ 371 Date: Dec. 14, 1982
§ 102(e) Date: Dec. 14, 1982

[87] PCT Pub. No.: WO82/03821
PCT Pub. Date: Nov. 11, 1982

[30] Foreign Application Priority Data

Apr. 29, 1981 [GB] United Kingdom ............... 8113271
May 28, 1981 [GB] United Kingdom ............... 8116352

[51] Int. Cl.³ .................. B32B 1/06; F16L 59/08; F16L 59/02
[52] U.S. Cl. .................... 428/166; 156/77; 156/205; 428/186; 428/188
[58] Field of Search .............. 156/78, 79, 77, 205; 428/54–56, 68, 71, 72, 74–76, 163, 172, 173, 186, 166, 167, 178, 184, 158, 159, 160, 188

[56] References Cited

U.S. PATENT DOCUMENTS

| 3,517,805 | 6/1970 | Gould | 428/188 |
|---|---|---|---|
| 3,563,837 | 2/1971 | Smith et al. | 428/158 |
| 3,576,704 | 4/1971 | Groce et al. | 428/159 |
| 3,813,279 | 5/1974 | Varner, Jr. | 428/166 |
| 4,304,824 | 12/1981 | Karpinski | 428/157 |
| 4,333,978 | 6/1982 | Kocher | 428/158 |

FOREIGN PATENT DOCUMENTS 2446176 8/1980 France ................. 428/158

Primary Examiner—William J. Van Balen
Attorney, Agent, or Firm—Ladas & Parry

[57] ABSTRACT

Insulating material is formed in a continuous strip and comprises a web of flexible impervious polymeric material in which individually spaced elongate pockets have been formed transversely across the elongate strip. Insulation material is located in the pockets which are covered by a sheet of impervious foil material, such as aluminium foil, which forms one outer surface of the completed web of insulating material. The foil is heat sealed to the polymeric material so that the insulation material in the pockets is totally encompassed by impervious material, thus minimizing deteriorization of the insulation properties of the insulation material. The insulation material can be foamed in the pockets or can take the form of powder or foam granules.

The construction of the web of insulating material allows the material to be folded into a relatively small volume for the most economic transportation, while in use as an insulating material, the pockets are butted together to form a most effective insulation layer for pipes in buildings, loft insulation, cavity wall insulation or insulation attached to preconstructed wall portions of timber frame houses.

13 Claims, 3 Drawing Figures

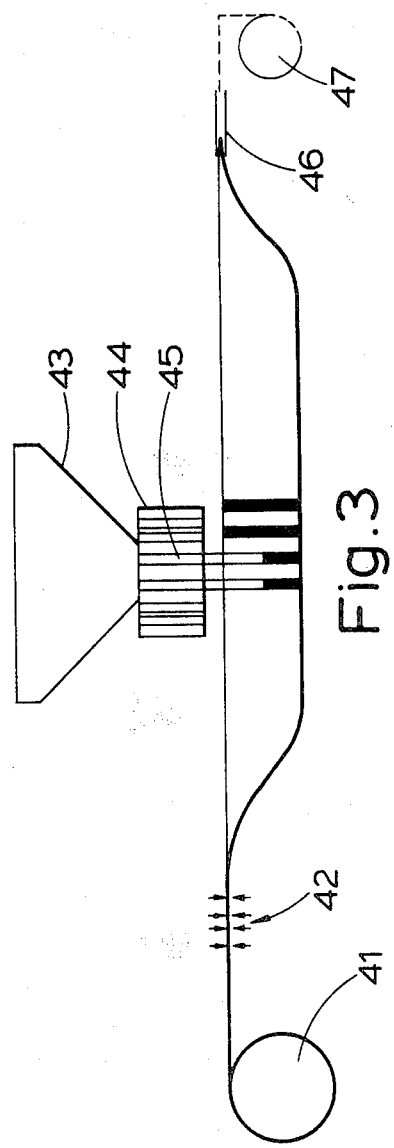
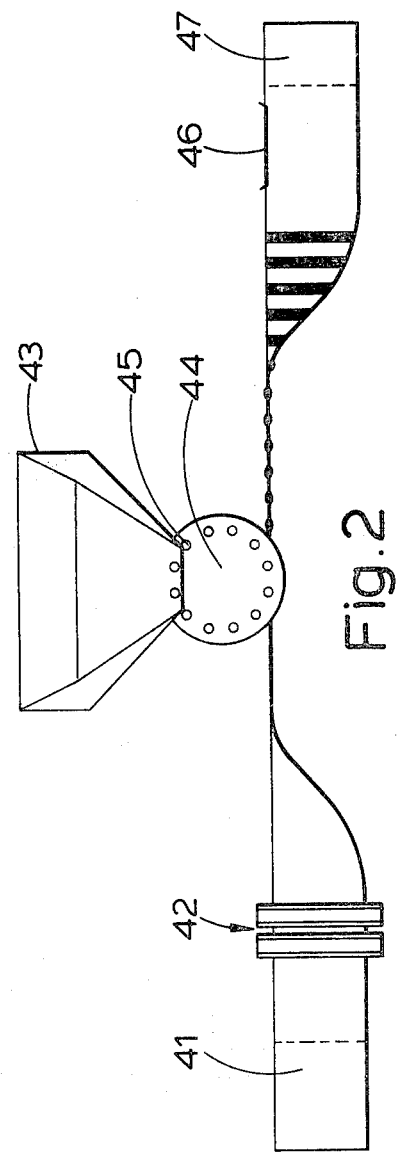

INSULATING MATERIAL

The invention relates to insulating materials.

Insulating material formed of blocks of foamed polymeric materials, such as polystyrene or polyurethane, disposed on an elongate flexible web and spaced from each other are extensively used for the thermal insulation of pipes etc. The blocks may be of various shapes and sizes from beads to flat elements having a trapezoidal cross-section. However, such insulating materials have the disadvantage of being bulky and since it is sold in rolls, these take up a large amount of storge space. Moreover, the insulating materials do not have very effective flame resistance properties.

According to the present invention there is provided an insulating material comprising a flexible web of impervious material, a plurality of individual strips of insulation material extending transverse to the longitudinal axis of the flexible web and completely encompassed by impervious material, and a metal foil forming at least one outer surface of the insulating material.

In a preferred form the strips of insulation material are spaced from each other by at least the width of one strip which will allow one to intersperse two web structures. The impervious material of the web is preferably a polymeric material.

In a preferred form parallel strips are spaced along the length of the web transverse to the length of the web. In a particularly preferred form the insulating material can be held in pockets of polymeric material attached to or forming part of the web. Thus the web can be two sheets of polymeric material joined together at spaced points to form pockets within which is located the insulating material.

The insulation material can be any porous material which can be used for insulation and thus can be synthetic polymeric foam such as polyurethane or polystyrene which can be in blocks or similar shapes or in particle form. There can also be used porous material derived from natural organic products such as cellulose foams or inorganic materials such as fiber-glass, micafill, rock wool, Perlite bead or powder, and similar materials. Some of these materials may have to be treated to enhance their flame resistance although it is an advantage of the invention that the choice of a suitable web material avoids specific treatment of the porous material. The term porous signifies that the material entraps bodies of air by reason of a cellular or fiborous particulate structure and therefore need not include a material which has specific pores within individual portions of the material. Thus the porous structure could arise from the loose structure of a powder material.

The insulating material according to the present invention advantageously combines the insulating properties of the insulation materials and metal foil. Moreover, the insulation material is completely surrounded by a polymeric material which prevents entry of damp which would otherwise affect the insulating and other properties of the insulation material. The presence of the polymeric web serves to strengthen the structure while the presence of metal foil such as aluminium foil provides excellent flame resistance and insulating properties.

The separation of the strips of insulation material gives greater flexibility than insulating webs of the known art. This flexibility permits, because of the very pliable web between the strips, a folding or pushing together of the strips of insulation material so as to provide maximum insulation in use.

The final product is much more easily handled than prior art forms in terms of rolling and storage, and the degree of insulation can be controlled by the degree to which the individual strips are pushed together and the insulating mateial with its significant distance between strips provides unexpectedly excellent insulation properties.

Although the insulating material is intended to be used for insulation it can be utilised in packaging when the transverse strips are formed of foamed polymeric material.

Embodiments of the present invention will now be described, by way of example, with reference to the accompanying drawings, in which:

FIG. 2 is a plan view of another apparatus for producing an insulating material according to the present invention; and FIG. 3 is a side view of the apparatus of FIG. 2.

Figure 1:
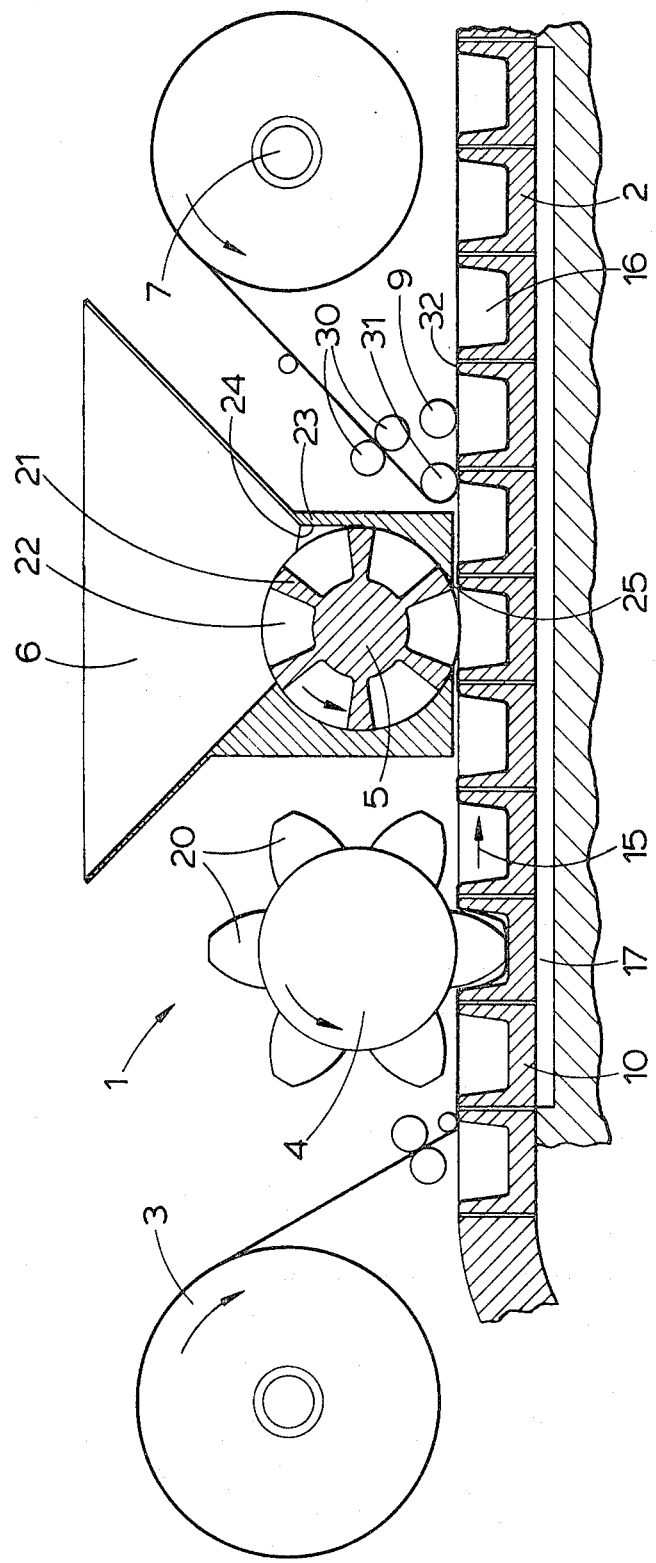
FIG. 1 is a side elevational view of one embodiment of an apparatus for producing an insulating material according to the present invention.

Referring now particularly to FIG. 1, the apparatus for forming an insulating material according to the present invention comprises an assembly station generally indicated 1 through which a continuous track 2, in the form of the continuous loop, is arranged to pass with the track lying in a substantially horizontal plane. The track moves at a constant speed an is continuously driven by a motor which can be an electric motor.

Above the track at the assembly station there is provided a supply roll 3 which supplies a continuous strip of polymeric material, a former star wheel 4, a feed star wheel 5 which is associated with a hopper 6, a supply roll 7 from which an aluminium foil laminate is suppled to one side of the insulation material and a heater 8 by means of which the aluminium foil laminate is heat sealed to the polymeric material.

The continuous track is formed by a plurality of elongate parallel formers 10 which extend transversely to the direction of movement of the track as indicated by the arrow 15. The formers 10 are each hollowed to form a recess 16. At the assembly station the formers pass over a vacuum chamber 17 which through passages (not shown) in each former, cause a vacuum to be applied to each recess 16 as will be described hereinafter.

The former star wheel 4 is in the form of a drum with elongate teeth 20 extending across the periphery thereof parallel to the longitudinal axis of the drum. The dimensions of each tooth 20 is such as to correspond to both the length and width of the recess 16 in the formers 10 so that the teeth can engage the recesses as indicated in FIG. 1.

The feed star wheel 5 is also in the form of a drum having teeth 21 extending both radially and longitudinally parallel to the rotational axis of the drum. The teeth 21 form therebetween spaces 22 which are utilised for transferring the material held in the hopper from the hopper to the recesses 10 in the former which, as will be described hereinafter, are covered by the polymeric film. The length of the teeth 22, in a direction parallel to the longitudinal axis of the feed star wheel, and the peripheral width of the spaces 22 correspond to the length and width of the recess 16 of each former 10. In order to ensure maximum transfer of the material loaded into the space 22 from the hopper, the drum rotates within a block 23 having an internally curved surface 24 which corresponds closely to the external periphery of the feed star wheel 5. The block 23 is provided at its bottom with an opening 25 through which the material transferred in the space 22 can be emptied into the recess 16 of the former 10.

The aluminium laminate foil is supplied via a pair of pinch rollers 30 and a further roller 31. The laminate comprises a 9 micron thick aluminium foil and a 15 micron load density polyethylene film and is supplied so that the polyethylene film is on the side of the aluminium foil facing the formers 10. As the laminate passes under the heater roller 9, the polyethylene film is heat sealed to the polymeric material supplied at the beginning of the assembly station as will now be described.

The construction of an insulating material according to the present invention is achieved at the assembly station 1 by feeding the polymeric material from the supply roll 3 between feed rollers so that the polymeric material lays across the top of the formers in FIG. 1. The feed speed of the supply roll 3 is matched to the speed of the movement of the continuous track so that the polymeric material and track move together at a constant speed. Simultaneously, the former star wheel 4 rotates in an anticlockwise direction and the teeth 20 engage the polymeric material forcing it into a recess 16 within a former 10. The vacuum from the vacuum chamber 17 then pulls the polymeric material onto the sides of the recess and holds the material in this position until the vacuum is released at the end of the assembly station. From the former star wheel 4 the formers 10 are then moved on to the feed star wheel 5 where polystyrene granules (not shown) are fed from the hopper 6 and dropped into the pocket formed by the polymeric material in the recess 16 in the former 10. The feed star wheel 5 also rotates in an anticlockwise direction and the speed of rotation is such that each consecutive space 22 corresponds with the next consecutive former so that there is a continuous feed from the hopper to the pockets formed in successive formers.

As previously indicated, the laminate aluminium foil is then fed from the roll 7 via rollers 30 and roller 31 so that the load density polyethylene film on one side of the aluminium foil is applied facing the formers so that this polyethylene film contacts the polymeric material where this latter material passes over sides or edges 32 of the formers 10. The heater roller 9 serves to heat seal the polyethylene film to the polymeric material and thus the polystyrene granules within the pocket are completely encompassed by an impervious material or materials.

As the formers move out of the assembly station, they become free from the influence of the vacuum chamber 17 and the elongate strip of insulating material so formed is released from the formers as the continuous track falls alway to loop back to the beginning of the assembly station. The insulating material so formed can be wound in a roll as desired.

In a preferred form of the embodiment just described, a low temperature heater can be provided so as to soften the film of polymeric material before the vacuum draws the polymeric film into the formers to make the pockets.

Referring to the embodiment of FIGS. 2 and 3, a loading station 41 is supplied with a roll of water impervious polyethylene film which is already folded along its center line so as to provide a continuous sealed edge. From the loading roll the film passes through an impulse sealer 42. This sealer forms strips across the width of the web or strip of polyethylene film so defining separate pockets which are closed at the folded edge of the film. In the illustrated embodiment a four bank impulse sealer is illustrated which simultaneously forms two pockets and a space separating the pockets. The space between the pockets can thus be enlarged or decreased without affecting the size of the pockets giving greater or lesser flexibility to the roll as desired. The web with its pockets then passes to a loading station. If necessary the web which may have been sealed while in a horizontal plane can be turned into a vertical plane with the open mouths of the pockets upwards before reaching the loading zone. In the illustrated form of the invention the loading zone comprises a hopper 43 containing particles of an expanded polymeric material, for example expanded polystyrene granules. The pellets pass to measuring carousel 44 having laoding zones 45 each accepting sufficient foam material for one pocket. The polymeric material passes from the loading zones of the carousel into the pockets of the web as they pass the carousel. The web then passes to an edge sealer 46 which closes the open mouth of the pocket at the edge of the web. Aluminium foil is then fed to engage one side of the web an can be sealed thereto by adhesive and the web is then fed to a takeup or collector roll 47. The metal foil is aluminium foil such as 9MU Aluminium foil attached to the flexible web by a 63MV LDPE adhesive film.

In another form of the invention two webs could be employed which would be joined at the initial sealer 42 to form both the pockets and seal along one edge so providing a margin along both edges at the termination of the sealing technique. Instead of the loading system for pelletised material the system could provide for injection of a polymeric material which would foam in situ within the pockets or would insert rods or other shaped forms of polymeric material into the pockets. Alternatively, shaped pieces of foam could be applied to a web, for example by adhesive, and a second web of material then applied to the assembly and sealed to the first web forming by appropriate seals pockets of impervious material about the pieces of foam.

The use of two foils can include as indicated above applying to a plain foil of aluminium an adhesive which either can be a heat activatable adhesive or an adhesive which provides a sufficient bond during the formation of the final product. In another technique the two sheets of aluminium foil can be joined at the appropriate points by high frequency electrical welding techniques or ultrasonic welding techniques all of which are known in the art for the joining together of aluminium foil materials. The location of the junction points and structural relation of the porous insulating materials are as described above.

In another form of the invention a foil or laminate of the type just described can be formed into series of pockets by folding or drawing down a portion of the material. These pockets are then filled with the porous insulation material and the two edges of the pocket are joined together as just described as are the ends of the pockets so that there is a single web of material the pockets being formed from the single web by the folding technique or drawing down technique just described.

In another technique two descending webs of material meet at a point immediately beneath a feed disposed transversely across the width of the webs so that portions of porous insulation material are dropped into the nip point at which the webs are meeting across the width of the web and thereafter the webs are heat sealed together to form the pockets between the webs for the foamed material. These techniques have the advantage that significant amounts of porous insulation material can be disposed rapidly on to the web as distinct from the technique previously described where material had to be poured into a pocket.

Various mechanical systems are contemplated for forming the insulating material of the invention, each involving a feed of a web material to a filling point folowed by a feeding system which forms a pocket of web material about the porous material either by joining two webs or sealing portions of a single web together.

For an insulation material the webs of flexible material can be chosen from various materials which will meet the fire resistant and fire retardant standards applicable to building materials and particularly insulation materials. Thus various polymeric materials which can be formed into films or flexible sheets can be employed with metallic foil materials or laminates employing metallic foils. Where these webs have to be jointed together such joining can, as indicated, be by nature of the heat sealing properties of the materials themselves by reason of the application of adhesives at the desired points of a junction or by welding or other available techniques.

Preferably, the spacing between the transverse strips formed on the web of insulating material is substantially equal to the width of one strip so that two strips of web when laid flat for insulating a roof of a house for example, can be intermeshed with the transverse strips of one web lying between the transverse strips of the other web. However in one alternative form the web of insulating material has pockets which extend lengthwise of the web by 12.7 cm with a gap of 2.5 cm between the pockets.

The product described in accordance with the above specific description can be sold by the roll. A dispenser can be supplied with the roll both to support the roll at the point of use and to provide a cutting edge so that portions of the web can be cut as desired. The web is completely flexible and has excellent flame resistant or retardant properties. A typical roll would be thirty feet long and could be of such a width as to provide nine inch, eighteen inch or twenty four inch pockets. When rolling the roll the regular spacing and shape of the transverse strips facilitate a reduction in the size of the roll compared to a roll of prior art web of the same length.

A length of the web was successfully tested to B.S. 874 1973 method 4-2-1 thermal conductivity test and was found to have a thermal conductivity of 0.042 W/mK.

While the web so formed is for use in insulation the web can be used for a wide variety of packaging purposes, the term packaging emcompassing for this purpose cushioning, void filling, and any other function in which foam material presently finds a use.

I claim:

1. An insulating material comprising a flexible web of spaced impervious material, a plurality of individual strips of insulation material extending transverse to the longitudinal axis of the flexible web each strip being completely encompassed by impervious material, and a metal foil forming at least one outer surface of the insulating material.

2. An insulating material as claimed in claim 1, wherein the strips are held within pockets of impervious material forming part of or attached to the web.

3. An insulating material as claimed in claim 1, wherein the web comprises a single sheet of impervious material folded longitudinally thereof to define overlapping portions which are adhered at spaced intervals to leave closed pockets between the overlapping portions.

4. An insulating material as claimed in claim 1, wherein the web comprises two sheets of impervious material adhered at spaced intervals to leave closed pockets between the sheets.

5. An insulating material as claimed in claim 4, wherein the pockets are filled with organic or inorganic insulating material.

6. An insulating material as claimed in claim 5, wherein the pockets are filled with a porous insulation material.

7. An insulating material as claimed in claim 6, wherein the porous insulation material comprises polymeric foam material.

8. An insulating material as claimed in claim 7, wherein the polymeric foam material is in particle form.

9. An insulation material as claimed in claim 8, wherein the web comprises pockets formed by drawing the web into troughs in a former, filling the pockets with insulation material, applying a laminate of metal foil and polyethelene film over the web and heat sealing the laminate to the web to form pockets of impervious material completely encompassing the insulation material.

10. An insulating material as claimed in claim 1, wherein the metal foil is aluminium foil.

11. An insulating material as claimed in claim 1, wherein the strips of insulation material are spaced from each other by at least the width of one strip.

12. An insulating material as claimed in claim 1, wherein the impervious material of the web is a polymeric material.

13. A method of forming an insulating material comprising providing an elongate web of flexible impervious material, fixing spaced individual strips of insulation material along the web transverse to the longitudinal axis of the web, each strip of insulating material being completely encompassed by impervious material and arranging for at least one outer surface of the insulating material to be a metal foil.

* * * * *